Patented Feb. 21, 1950

2,498,497

UNITED STATES PATENT OFFICE 2,498,497

2[2(PHTHALIMIDO)ETHYL]PYRIDINES

Frederick K. Kirchner and Chester J. Cavallito, Albany, N. Y., assignors to Sterling Drug Inc., New York, N. Y., a corporation of Delaware No Drawing. Application June 10, 1949,
Serial No. 98,392

3 Claims. (Cl. 260—295)

This invention relates to 2-[2-(phthalimido)-ethyl]pyridine and salts thereof and to a process for preparing the same.

It has been discovered that 2-[2-(phthalimido)-ethyl]pyridine and its salts are useful as pharmacological agents, for example, for producing mild analgesia.

It has now been found that phthalimide condenses with an approximately equimolecular proportion of 2-vinyl pyridine in the presence of an alkaline condensing agent, thus yielding 2-[2-(phthalimido)ethyl]pyridine, which product can, if desired, be easily converted to its acid addition salts in conventional manner, as for example by direct interaction of the base with the acid in the presence of a solvent. The condensation reaction proceeds according to the following equation:

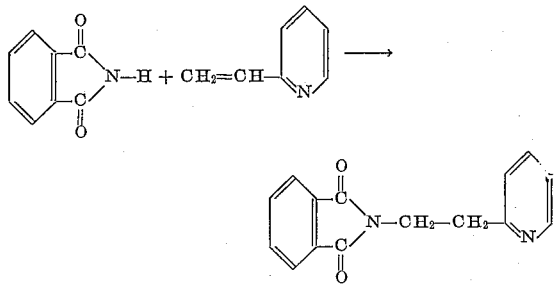

The above reaction provides the desired amine in good yield and isolation of the product is accomplished simply and without difficulty.

As the alkaline condensing agent in the condensation reaction, there can be employed a small quantity of a strong organic or inorganic base, for example, a quaternary ammonium compound such as trimethyl-benzyl-ammonium hydroxide, sodamide, potassium amide, an alkali metal alcoholate, etc.

2-[2-(phthalimido)ethyl]pyridine itself has only a limited water-solubility, and it is usually more convenient to employ it therapeutically as the more water-soluble acid addition salts, such as those derived from non-toxic inorganic acids, including hydrochloric acid, hydrobromic acid, sulfuric acid, phosphoric acid, nitric acid, and the like, and non-toxic organic acids, including tartaric acid, citric acid, succinic acid, and the like, can be employed. The base can also be used in the form of quaternary ammonium salts derived from lower alkyl esters of strong inorganic esters, organic sulfonic acids, and the like, such as methyl chloride, methyl bromide, methyl iodide, ethyl bromide, methyl sulfate, etc.

This invention is illustrated by the following example without, however, being limited thereto.

*Example*

In a two-liter, three-neck round-bottom flask fitted with a thermometer and condenser, there were placed 380 g. of phthalimide and 276 ml. of 2-vinyl-pyridine. After adding 1 ml. of trimethyl-benzyl-ammonium hydroxide to the solution the mixture was heated under reflux until only one phase was present. The reaction mixture reached a temperature of 188° without appreciable refluxing (about two hours). The reaction mixture was cooled to 110° and a total of 500 ml. of chloroform was added in small portions through the condenser and the chloroform solution was then cooled to 10° C. A small amount of solid which precipitated at this point was filtered off. To the cooled and stirred chloroform solution there was added petroleum ether. The resulting precipitate was collected on a filter and washed with a chloroform-petroleum ether mixture (1:3) until the washings were clear. By concentrating the mother liquor, cooling, and adding petroleum ether as before, an additional quantity of product was obtained and added to the main portion of collected precipitate. In this manner there was obtained 511 g. of 2-[2-(phthalimido)ethyl]pyridine, which melted at approximately 95–97° C. A portion of this product was converted to the hydrochloride, which melted at approximately 214–215° C.

What is claimed is:

1. A compound selected from the group consisting of 2[2-(phthalimido)ethyl]pyridine and its salts.

2. 2[2-(phthalimido)ethyl]pyridine, having the structural formula

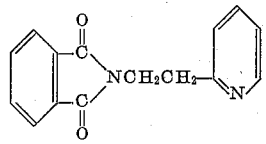

and melting at approximately 95–97° C.

3. The process for preparing 2-[2-(phthalimido)ethyl]pyridine which comprises heating phthalimide with 2-vinyl pyridine, in the presence of an alkaline condensing agent.

FREDERICK K. KIRCHNER.
CHESTER J. CAVALLITO.

No references cited.